US012116230B2

(12) United States Patent
Tanaka et al.

(10) Patent No.: US 12,116,230 B2
(45) Date of Patent: Oct. 15, 2024

(54) TRANSPORT DEVICE AND IMAGE FORMING APPARATUS

(71) Applicant: FUJIFILM Business Innovation Corp., Tokyo (JP)

(72) Inventors: Kei Tanaka, Kanagawa (JP); Naohito Otsuki, Kanagawa (JP); Hiroyuki Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 300 days.

(21) Appl. No.: 17/540,245

(22) Filed: Dec. 2, 2021

(65) Prior Publication Data

US 2023/0064897 A1 Mar. 2, 2023

(30) Foreign Application Priority Data

Aug. 25, 2021 (JP) ................................ 2021-137611

(51) Int. Cl.
*B65H 5/14* (2006.01)
*B41J 13/08* (2006.01)
(Continued)

(52) U.S. Cl.
CPC ................ *B65H 5/12* (2013.01); *B41J 13/08* (2013.01); *B41J 13/223* (2013.01); *B65H 5/028* (2013.01); *B65H 5/14* (2013.01); *B65H 5/38* (2013.01); *B65H 29/04* (2013.01); *B65H 29/045* (2013.01); *B65H 29/06* (2013.01); *G03G 15/1685* (2013.01); *G03G 15/2053* (2013.01); *G03G 15/6558* (2013.01); *G03G 15/657* (2013.01)

(58) Field of Classification Search
CPC . B65H 5/12; B65H 5/028; B65H 5/14; B65H 5/38; B65H 29/04; B65H 29/045; B65H 29/06; G03G 15/1685; G03G 15/2053; G03G 15/6558; G03G 15/657; B41J 13/08; B41J 13/223
See application file for complete search history.

(56) References Cited

U.S. PATENT DOCUMENTS

| | | | | |
|---|---|---|---|---|
| 5,287,809 | A * | 2/1994 | Greive | B65H 9/14 101/142 |
| 2020/0156889 | A1* | 5/2020 | Egawa | B41J 13/223 |
| 2021/0294246 | A1 | 9/2021 | Yoshioka et al. | |

FOREIGN PATENT DOCUMENTS

| | | |
|---|---|---|
| JP | 2001310444 | 11/2001 |
| JP | 2020140062 | 9/2020 |

* cited by examiner

*Primary Examiner* — Thomas A Morrison
(74) *Attorney, Agent, or Firm* — JCIPRNET

(57) ABSTRACT

A transport device includes a rotating member that rotates; a circulating member that is loop-shaped and wrapped around the rotating member, the circulating member being circulated by rotation of the rotating member; a pair of pinching members attached to the circulating member and circulated together with the circulating member, the pair of pinching members changing from a separated state, in which the pair of pinching members are separated from each other, to a closely positioned state to pinch a transport object that has entered a space between the pair of pinching members in the separated state; and a guide unit positioned to overlap the pair of pinching members in the separated state when viewed in one direction along a rotational axis direction of the rotating member, the guide unit guiding the transport object into the space between the pair of pinching members in the separated state.

20 Claims, 12 Drawing Sheets

(51) Int. Cl.

| | |
|---|---|
| ***B41J 13/22*** | (2006.01) |
| ***B65H 5/02*** | (2006.01) |
| ***B65H 5/12*** | (2006.01) |
| ***B65H 5/38*** | (2006.01) |
| ***B65H 29/04*** | (2006.01) |
| ***B65H 29/06*** | (2006.01) |
| *G03G 15/00* | (2006.01) |
| *G03G 15/16* | (2006.01) |
| *G03G 15/20* | (2006.01) |

TRANSPORT DEVICE AND IMAGE FORMING APPARATUS

CROSS-REFERENCE TO RELATED APPLICATIONS

This application is based on and claims priority under 35 USC 119 from Japanese Patent Application No. 2021-137611 filed Aug. 25, 2021.

BACKGROUND

(i) Technical Field

The present disclosure relates to a transport device and an image forming apparatus.

(ii) Related Art

Japanese Unexamined Patent Application Publication No. 2020-140062 discloses an image forming apparatus including a loop-shaped transfer belt having an outer surface to which an image is transferred; a transfer unit including a transfer cylinder and rotating bodies, the transfer cylinder having a transfer area in which a recording medium is sandwiched between the transfer cylinder and the outer surface of the transfer belt to transfer the image from the transfer belt to the recording medium, the rotating bodies being disposed at both ends of the transfer cylinder in an axial direction; circulating members wrapped around the rotating bodies and circulated by rotation of the rotating bodies; and a holding unit attached to the circulating members, the holding unit holding the recording medium so that the recording medium is transported by circulation of the circulating members and caused to pass through the transfer area.

SUMMARY

A transport device may include a rotating member, such as a sprocket, that rotates; a circulating member, such as a chain, that is wrapped around the rotating member and circulated by rotation of the rotating member; a pair of pinching members attached to an attachment portion of the circulating member and circulated together with the circulating member, the pair of pinching members changing from a separated state, in which the pair of pinching members are separated from each other, to a closely positioned state to pinch a transport object, such as a paper sheet, that has entered a space between the pair of pinching members in the separated state; and a guide unit that guides the transport object into the space between the pair of pinching members in the separated state.

According to this structure, if the guide unit is displaced from the pair of pinching members in the separated state when viewed in one direction along an axial direction of the rotating member, the pair of pinching members easily vary their positions in a process of pinching the transport object, and may fail to pinch the transport object. Here, the expression "fail to pinch the transport object" includes not only a case in which the transport object cannot be pinched but also a case in which the transport object cannot be pinched appropriately (for example, a case in which the transport object is pinched in a tilted manner or is pinched insufficiently or excessively.

Aspects of non-limiting embodiments of the present disclosure relate to a reduction in failures in pinching the transport object with the pair of pinching members compared to a configuration in which the guide unit is displaced from the pair of pinching members in the separated state when viewed in one direction along an axial direction of the rotating member.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a transport device including: a rotating member that rotates; a circulating member that is loop-shaped and wrapped around the rotating member, the circulating member being circulated by rotation of the rotating member; a pair of pinching members attached to the circulating member and circulated together with the circulating member, the pair of pinching members changing from a separated state, in which the pair of pinching members are separated from each other, to a closely positioned state to pinch a transport object that has entered a space between the pair of pinching members in the separated state; and a guide unit positioned to overlap the pair of pinching members in the separated state when viewed in one direction along a rotational axis direction of the rotating member, the guide unit guiding the transport object into the space between the pair of pinching members in the separated state.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will now be described with reference to the drawings.

FIRST EXEMPLARY EMBODIMENT

Image Forming Apparatus 10

Figure 1:
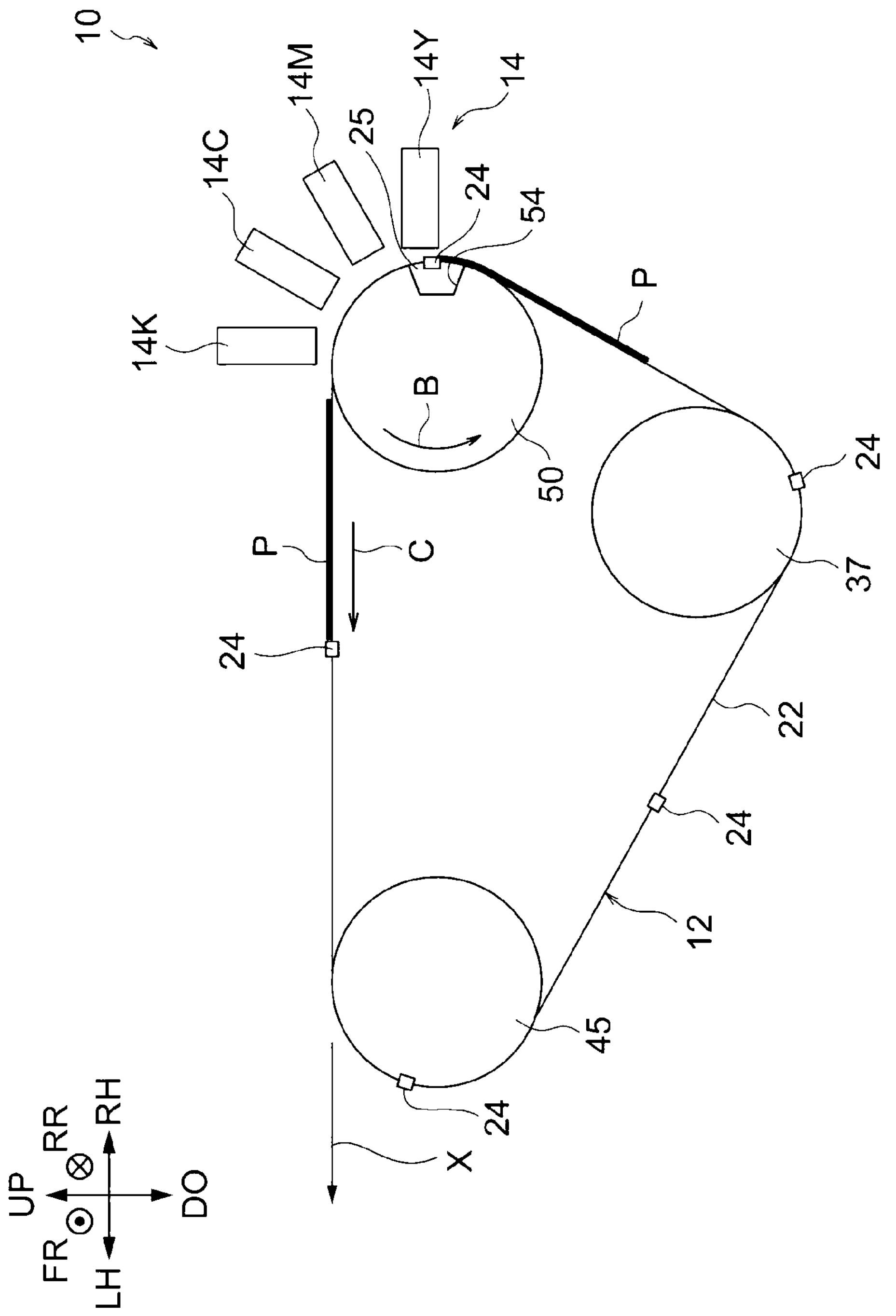
FIG. 1 is a schematic diagram illustrating the structure of an image forming apparatus according to a first exemplary embodiment.

The structure of an image forming apparatus 10 according to a first exemplary embodiment will be described. FIG. 1 is a schematic diagram illustrating the structure of the image forming apparatus 10 according to the present exemplary embodiment.

In the drawings, arrow UP shows an upward (vertically upward) direction of the apparatus, and arrow DO shows a downward (vertically downward) direction of the apparatus. In addition, arrow LH shows a leftward direction of the apparatus, and arrow RH shows a rightward direction of the apparatus. In addition, arrow FR shows a forward direction of the apparatus, and arrow RR shows a rearward direction of the apparatus. These directions are defined for convenience of description, and the structure of the apparatus is not limited to theses directions. The directions of the apparatus may be referred to without the term "apparatus". For example, the "upward direction of the apparatus" may be referred to simply as the "upward direction".

In addition, in the following description, the term "up-down direction" may be used to mean either "both upward and downward directions" or "one of the upward and downward directions". The term "left-right direction" may be used to mean either "both leftward and rightward directions" or "one of the leftward and rightward directions". The left-right direction may also be referred to as a lateral direction or a horizontal direction. The term "front-rear direction" may be used to mean either "both forward and rearward directions" or "one of the forward and rearward directions". The front-rear direction corresponds to a width direction of recording media P described below and an axial direction of sprockets 37 described below, and may also be referred to as a lateral direction or a horizontal direction. The up-down direction, the left-right direction, and the front-rear direction cross each other (more specifically, are orthogonal to each other).

In the figures, a circle with an X in the middle represents an arrow going into the page, and a circle with a dot in the middle represents an arrow coming out of the page.

The image forming apparatus 10 illustrated in FIG. 1 is an inkjet image forming apparatus that forms an ink image (example of an image) on each of recording media P. More specifically, the image forming apparatus 10 includes an image forming unit 14 and a transport device 12. The recording media P may be, for example, paper sheets P. In the following description, components (image forming unit 14 and transport device 12) of the image forming apparatus 10 will be described.

Image Forming Unit 14

The image forming unit 14 has a function of forming an ink image on each of the recording media P that is transported. More specifically, as illustrated in FIG. 1, the image forming unit 14 includes discharge units 14Y, 14M, 14C, and 14K (hereinafter referred to as discharge units 14Y to 14K) which each discharge ink toward a predetermined discharge position.

The discharge units 14Y to 14K are arranged in that order toward a downstream side in a transporting direction in which the recording media P are transported. The discharge units 14Y to 14K are long in a width direction of the recording media P. The width direction of the recording media P is a direction that crosses the transporting direction (more specifically, that is orthogonal to the transporting direction), and is a direction along the front-rear direction.

The discharge units 14Y to 14K of the image forming unit 14 discharge ink droplets toward each recording medium P transported by the transport device 12 by a known method, such as a thermal method or a piezoelectric method, to form an ink image on the recording medium P.

Transport Device 12

Figure 2:
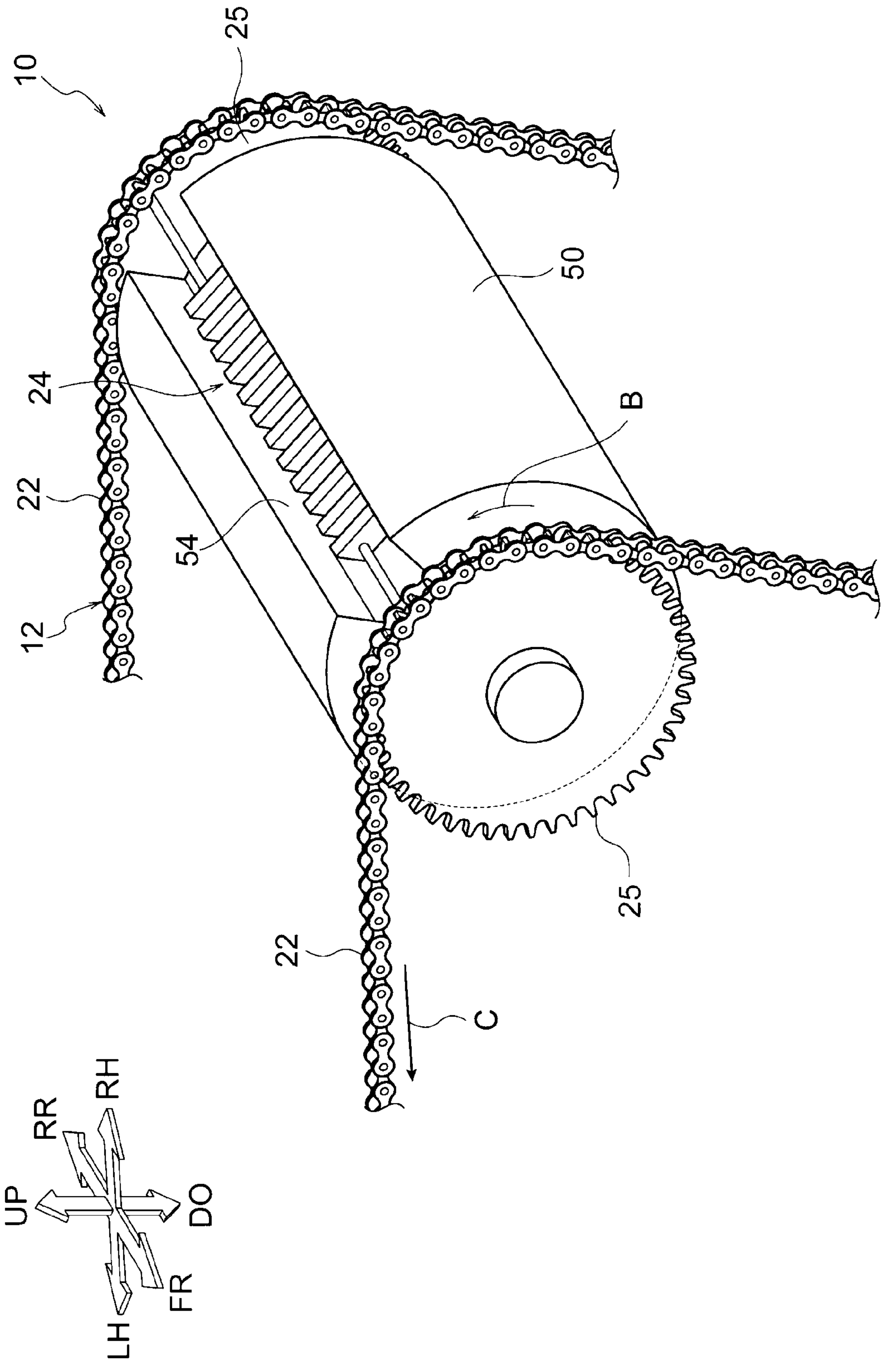
FIG. 2 is a perspective view illustrating the structure of a part including a rotating body according to the first exemplary embodiment.

The transport device 12 illustrated in FIG. 1 is a device that transports the recording media P. As illustrated in FIGS. 1 and 2, the transport device 12 includes a rotating body 50, pairs of sprockets 25, 37, and 45, a pair of chains 22, grippers 24, and a delivery mechanism 60 (see FIG. 6).

The recording media P are examples of a "transport object". The pair of sprockets 37 are each an example of a "rotating member". The pair of chains 22 are each an example of a "circulating member". Each gripper 24 includes lugs 26 and a lug base 27 (see FIG. 4) described below that are an example of a "pair of pinching members".

FIG. 1 illustrates one of the pair of chains 22, one of the pair of sprockets 25, one of the pair of sprockets 37, and one of the pair of sprockets 45. In addition, the chain 22 and the grippers 24 are simplified in FIG. 1. The gripper 24 illustrated in FIG. 2 is also simplified.

As illustrated in FIG. 1, the rotating body 50 is disposed to face the discharge units 14Y to 14K. The rotating body 50 is circular in rearward view, and has a recess 54 in an outer peripheral surface thereof. The recess 54 is formed in the outer peripheral surface of the rotating body 50 at one location in the circumferential direction. The recess 54 is long in the axial direction of the rotating body 50, and has a depth in the radial direction of the rotating body 50.

The rearward view is a view of an object (rotating body 50 in this case) viewed in a front-to-rear direction. More specifically, the rearward view is a view of the object viewed in a rearward direction, which is one direction along a rotational axis direction of the pair of sprockets 37.

As illustrated in FIG. 2, the pair of sprockets 25 are provided at both ends of the rotating body 50 in the axial direction. The pair of sprockets 25 are arranged coaxially with the rotating body 50 and configured to rotate together with the rotating body 50. The rotating body 50 and the pair of sprockets 25 are rotated by a driving unit (not illustrated).

As illustrated in FIG. 1, the pair of sprockets 45 are disposed on the left side (downstream in the transporting direction) of the pair of sprockets 25. The pair of sprockets 45 are arranged in the front-rear direction with an interval therebetween.

The pair of sprockets 37 are disposed below the pair of sprockets 25 and the pair of sprockets 45 and on the left side (on the same side as the pair of sprockets 45) of the pair of sprockets 25. The pair of sprockets 37 are arranged in the front-rear direction with an interval therebetween.

As illustrated in FIG. 1, each of the pair of chains 22 is loop-shaped. As illustrated in FIG. 2, the pair of chains 22 are arranged in the front-rear direction with an interval therebetween. Each of the pair of chains 22 is wrapped around corresponding ones of the pairs of sprockets 25, 37, and 45. More specifically, each of the pair of chains 22 is in mesh with the corresponding ones of the pairs of sprockets 25, 37, and 45.

The rotating body 50 and the pair of sprockets 25 are rotated together in a rotation direction B (direction of arrow B), so that the pairs of sprockets 37 and 45 are also rotated and that the pair of chains 22 are circulated in a circulation direction C (direction of arrow C). Thus, the pair of chains 22 are circulated by rotation of the pairs of sprockets 25, 37, and 45.

Figure 3:
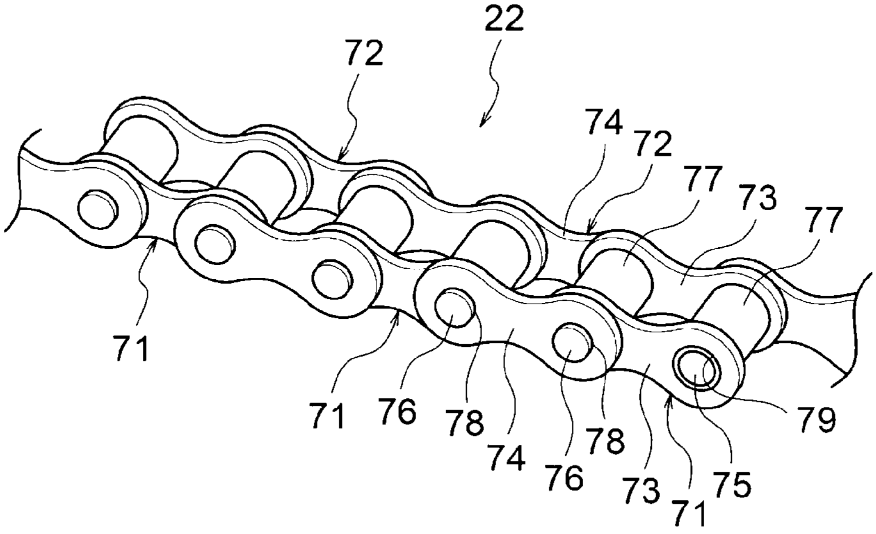
FIG. 3 is a perspective view illustrating a chain according to the first exemplary embodiment.

As illustrated in FIG. 3, each chain 22 includes plural inner links 71 and plural outer links 72 that are alternately connected to each other. Each inner link 71 includes two inner plates 73, two bushings 75, and two rollers 77. The two bushings 75 are press-fitted to two holes 79 formed in the two inner plates 73. The two rollers 77 are rotatably supported by outer peripheries of the two bushings 75. Each outer link 72 includes two outer plates 74 and two pins 76. The two pins 76 are press-fitted to two holes 78 formed in the two outer plates 74. The chain 22 is structured such that the bushings 75 are disposed around the pins 76 and that the rollers 77 are disposed around the bushings 75. The inner links 71 and the outer links 72 of the chain 22 mesh with teeth of the corresponding ones of the pairs of sprockets 25, 37, and 45.

Figure 4:
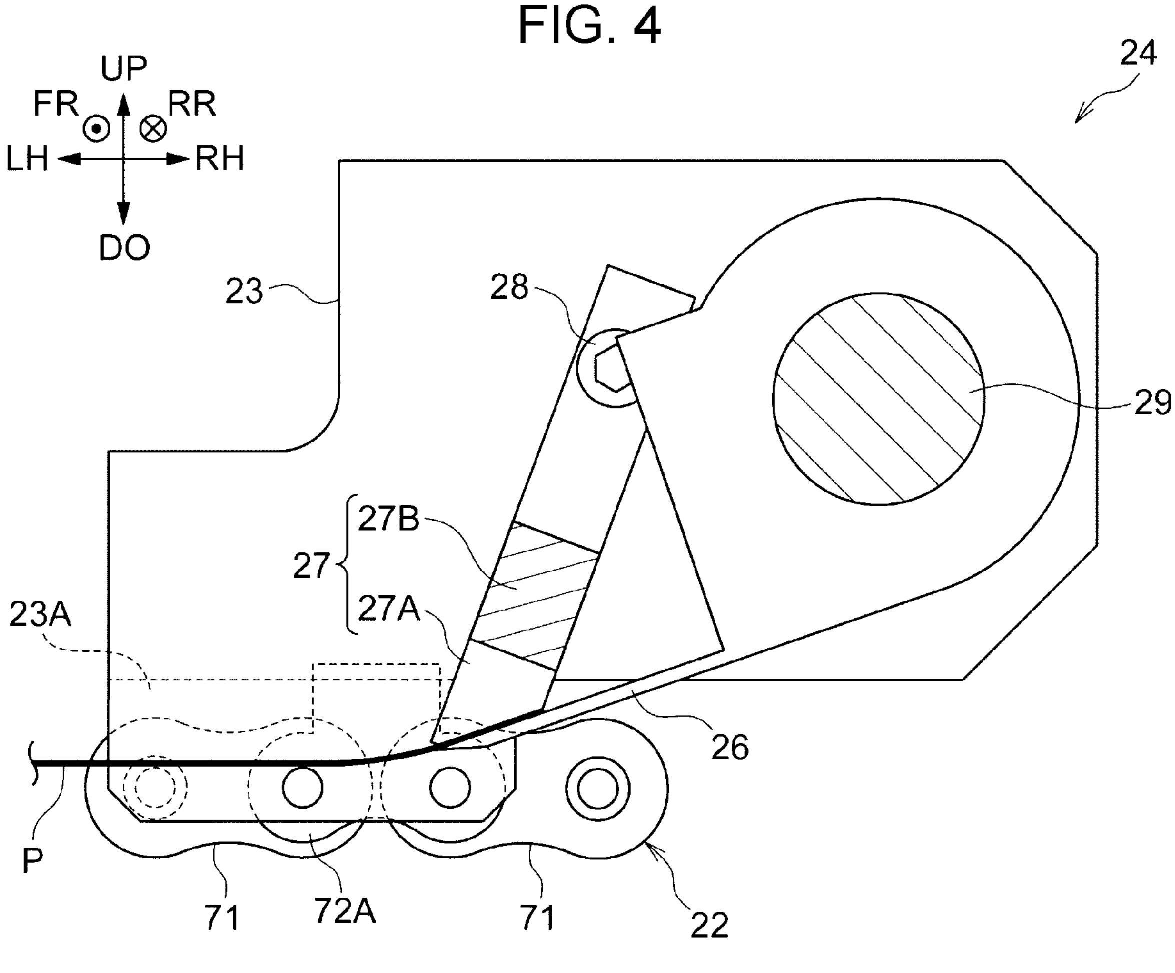
FIG. 4 is a sectional view of a gripper according to the first exemplary embodiment.
Figure 5:
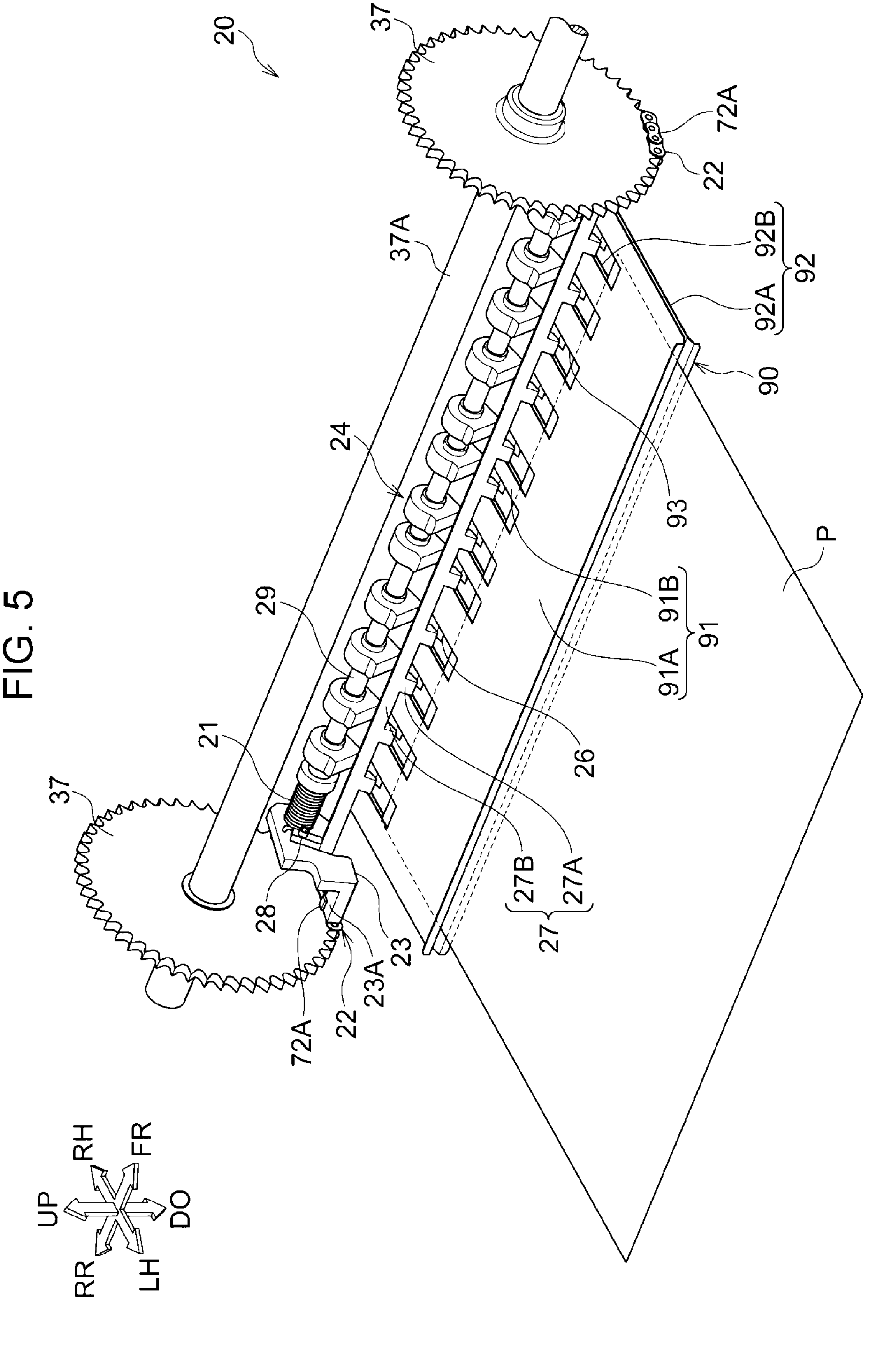
FIG. 5 is a perspective view of the gripper, sprockets, and a medium guide unit according to the first exemplary embodiment.
Figure 11:
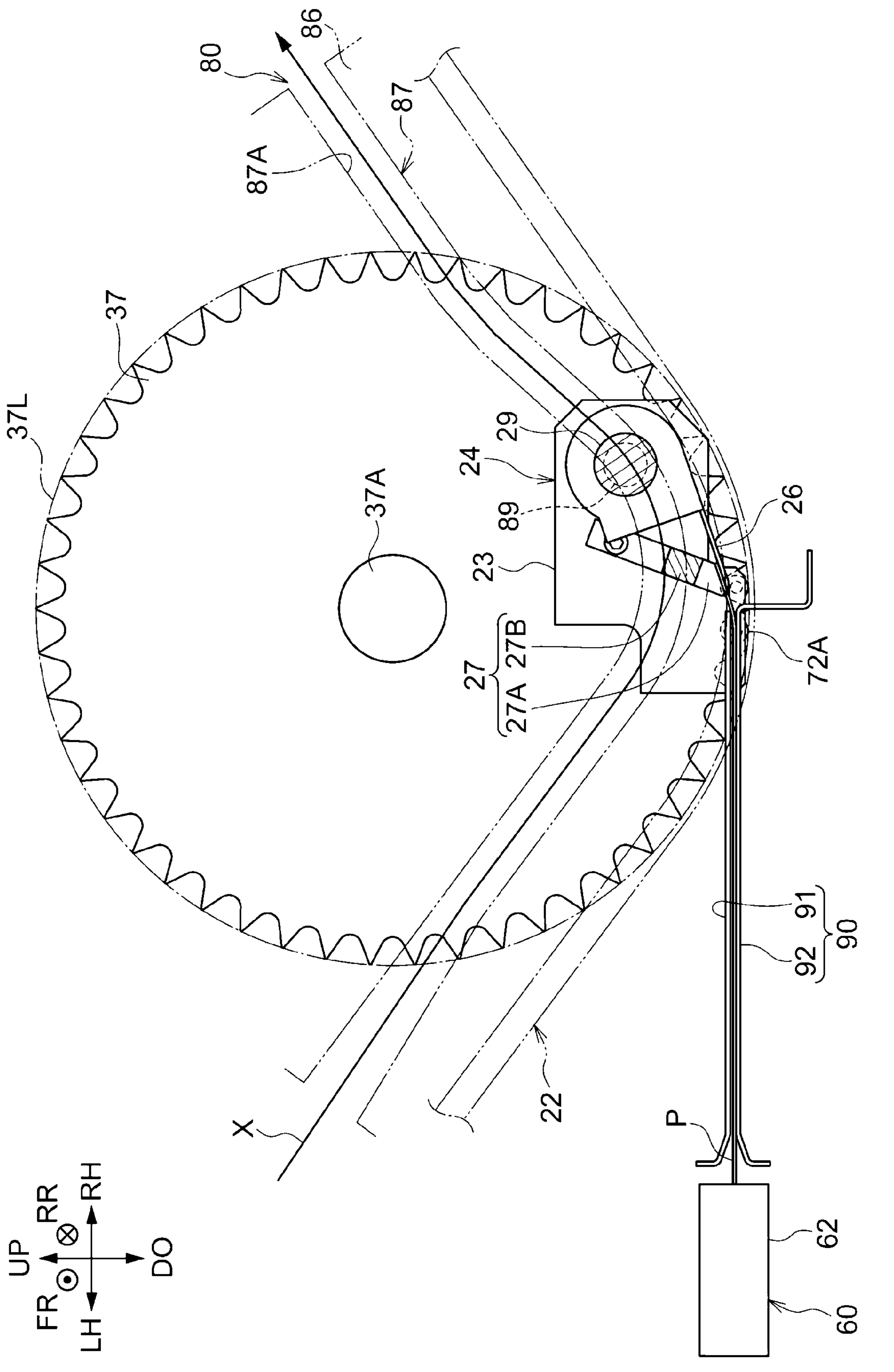
FIG. 11 is a sectional view illustrating the sequential operation in which the recording medium is received by the gripper according to the first exemplary embodiment.
Figure 12:
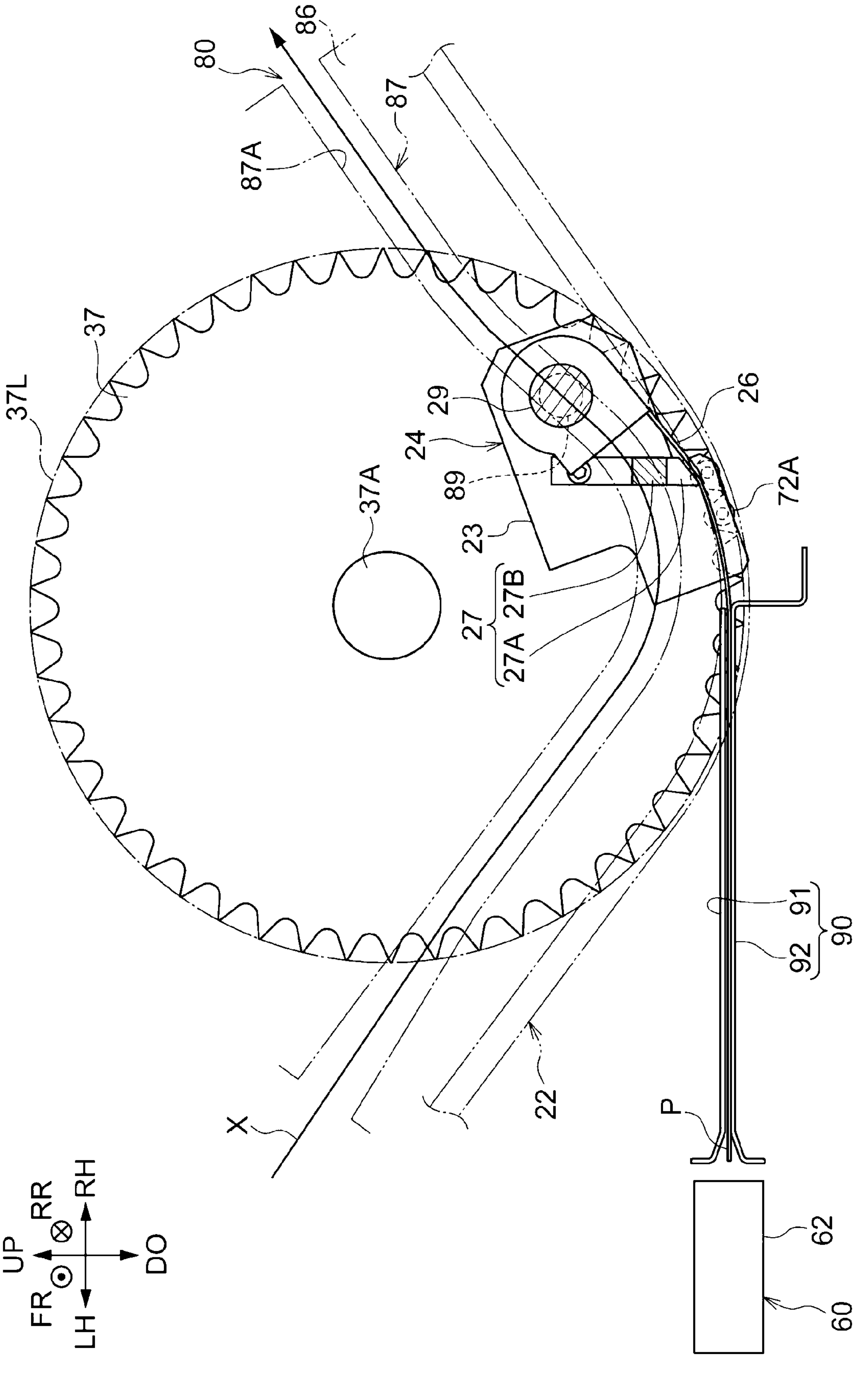
FIG. 12 is a sectional view illustrating the sequential operation in which the recording medium is received by the gripper according to the first exemplary embodiment.

The gripper 24 illustrated in FIGS. 4 and 5 functions as a holding unit that holds a leading end portion of the recording medium P (see FIGS. 4, 11, and 12). As illustrated in FIG. 1, plural grippers 24 are provided on the chains 22 and are arranged in the circulation direction C of the chains 22 with intervals therebetween. Referring to FIGS. 4 and 5, each gripper 24 includes a pair of attachment members 23, plural lugs 26, a lug base 27, and a shaft 29.

The shaft 29 extends between the pair of chains 22 from one to the other of the pair of chains 22 in the front-rear direction. In other words, the shaft 29 is a shaft portion having an axial direction extending in the front-rear direction. FIGS. 4 and 5 illustrate portions of the chains 22.

The pair of attachment members 23 are attached to the chains 22. The pair of attachment members 23 are disposed between the pair of chains 22 at one end (more specifically, rear end) and the other end (more specifically, front end) of the shaft 29 in the axial direction. The pair of attachment members 23 support the shaft 29 in a rotatable manner.

Each of the pair of attachment members 23 includes an attachment part 23A that extends outward (that is, toward a corresponding one of the chains 22) in the axial direction. The attachment part 23A is attached to one of the outer links 72 of the corresponding chain 22. Thus, each attachment member 23 is used to attach the gripper 24 to one of the outer links 72. In other words, the gripper 24 is fixed to the chains 22 by the attachment members 23. Accordingly, the gripper 24 is circulated together with the chains 22. In the following description, the outer links 72 to which the attachment members 23 are attached are referred to as attachment links 72A. The attachment links 72A are examples of an "attachment portion".

Although FIG. 5 illustrates only one of the pair of attachment members 23 that is disposed at one end (more specifically, rear end) of the shaft 29 in the axial direction, the other attachment member 23 is disposed at the other end (more specifically, front end) of the shaft 29 in the axial direction. The attachment member 23 disposed at the front end of the shaft 29 is attached to the chain 22 disposed at the front end of the shaft 29 in a similar manner.

The lug base 27 extends between the pair of attachment members 23 from one to the other of the pair of attachment members 23 in the front-rear direction. One and the other end portions of the lug base 27 in the longitudinal direction are each fixed to a corresponding one of the attachment members 23 with a fastener 28, such as a bolt.

The lug base 27 includes a body portion 27B that extends in the front-rear direction and plural projecting portions 27A that project downward in FIGS. 4 and 5. As illustrated in FIG. 5, the projecting portions 27A are arranged in the longitudinal direction of the body portion 27B with intervals therebetween. The projecting portions 27A and the lugs 26 are examples of "portions that pinch the transport object".

The lugs 26 are arranged in the axial direction of the shaft 29 with intervals therebetween. More specifically, the lugs 26 are positioned to face the projecting portions 27A of the lug bases 27. The lugs 26 rotate (forward and backward) together with the shaft 29 that is rotatably supported by the attachment members 23, and thereby moves toward and away from the lug base 27 (more specifically, the projecting portions 27A). In other words, the lugs 26 and the lug base 27 are changeable between a separated state (state illustrated in FIGS. 8 and 9) in which they are separated from each other and a closely positioned state (state illustrated in FIGS. 4, 6, 7, 11, and 12) in which they are close to each other.

In the gripper 24, for example, the lugs 26 are pressed against the lug base 27 by elastic force of an elastic member 21, such as a spring, so that the lugs 26 and the lug base 27 are in the closely positioned state. The lugs 26 and the lug base 27 change to the separated state against the elastic force by an operation of, for example, a cam.

The lugs 26 and the lug base 27 of the gripper 24 change from the separated state (state illustrated in FIGS. 8 and 9) to the closely positioned state (state illustrated in FIG. 11) to pinch the recording medium P that has entered the space therebetween in the separated state (see FIG. 11). Thus, the gripper 24 holds the leading end portion of the recording medium P.

In the transport device 12, one of the recording media P stored in a storage unit (not illustrated) is fed to the delivery mechanism 60, and the delivery mechanism 60 delivers the fed recording medium P to one of the grippers 24 in a delivery region located upstream of the discharge positions of the discharge units 14Y to 14K. The gripper 24 that has received the recording medium P from the delivery mechanism 60 holds the leading end portion of the recording medium P.

The chains 22 are circulated so that the gripper 24 holding the leading end portion of the recording medium P moves along an arc-shaped path along the outer peripheries of the sprockets 25 and the rotating body 50 (see FIG. 1). Thus, the recording medium P is placed on the outer peripheral surface of the rotating body 50.

The gripper 24 is circulated together with the chains 22 while being placed in the recess 54 and holding the leading end portion of the recording medium P placed on the outer peripheral surface of the rotating body 50. Accordingly, the recording medium P passes through the discharge positions of the discharge units 14Y to 14K, and the discharge units 14Y to 14K discharge ink droplets toward the recording medium P placed on the outer peripheral surface of the rotating body 50 so that an image is formed on the recording medium P.

Delivery Mechanism 60

The delivery mechanism 60 is a mechanism to which one of the recording media P stored in the storage unit (not illustrated) is fed and that delivers the fed recording medium P to one of the grippers 24.

Figure 6:
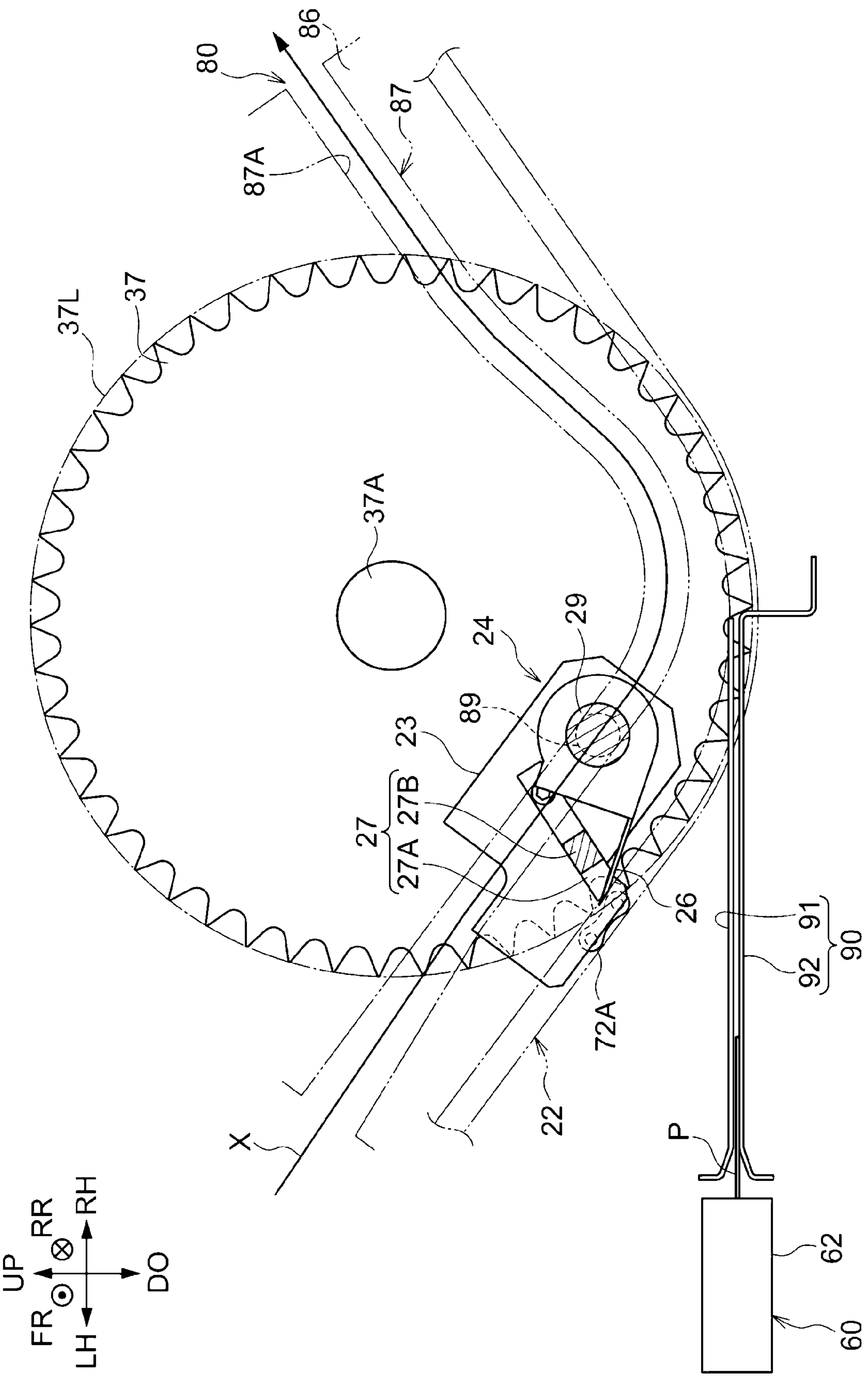
FIG. 6 is a sectional view illustrating a sequential operation in which a recording medium is received by the gripper according to the first exemplary embodiment.
Figure 7:
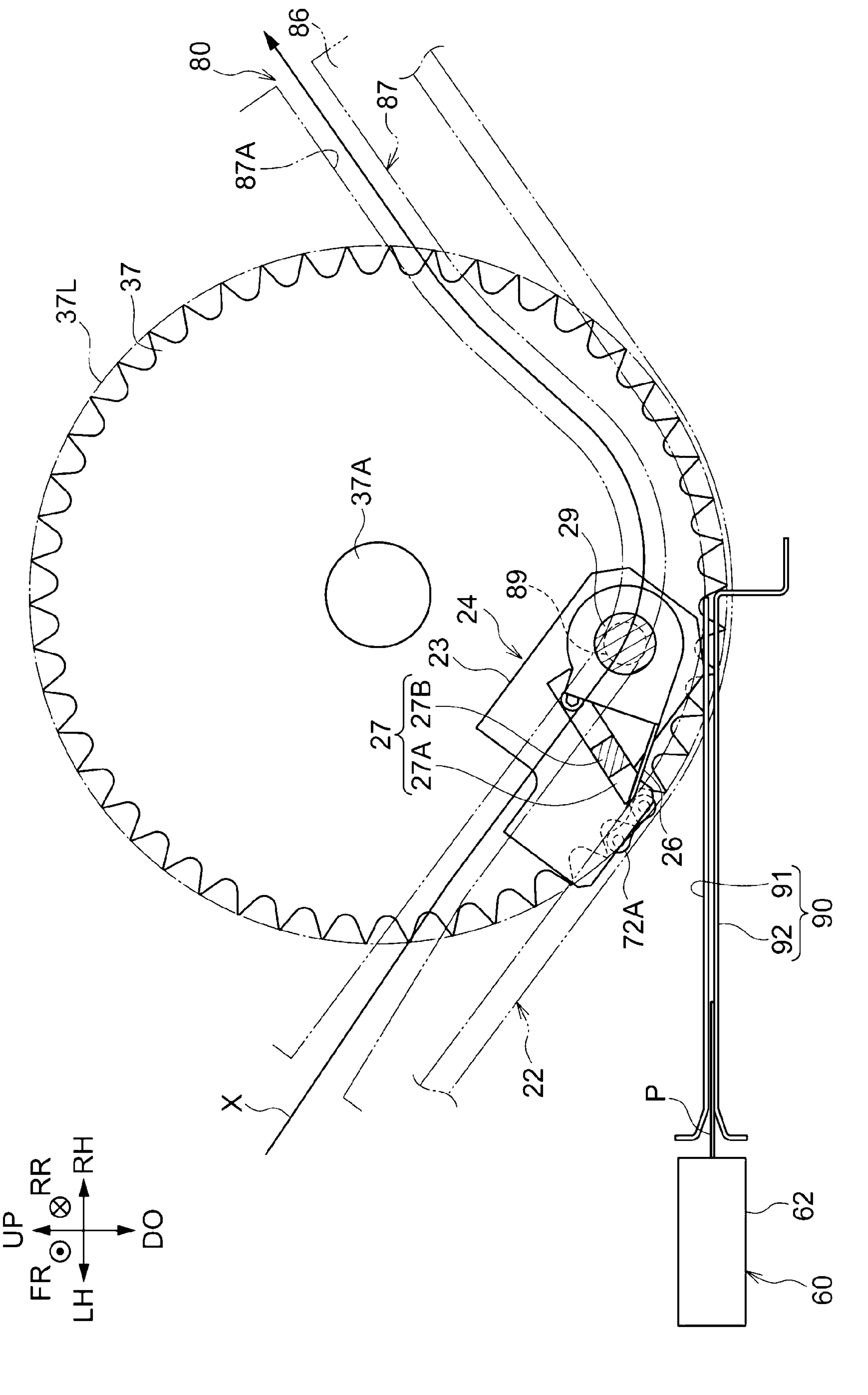
FIG. 7 is a sectional view illustrating the sequential operation in which the recording medium is received by the gripper according to the first exemplary embodiment.

The delivery region, in which the recording medium P is delivered to one of the grippers 24, is provided on a circulating path along which the grippers 24 are circulated. Referring to FIGS. 7 to 12, the pair of attachment links 72A of one of the grippers 24 mesh with respective ones of the pair of sprockets 37 in the delivery region. In other words, the delivery region is set on the circulating path of the grippers 24 at a location where the pair of attachment links 72A mesh with the respective ones of the pair of sprockets 37. More specifically, the delivery region is set on the outer peripheries of the pair of sprockets 37 along the circulating path of the grippers 24. FIGS. 6 to 12 illustrate one of the pair of attachment links 72A that is disposed at the rear end and one of the pair of sprockets 37 that is disposed at the rear end. In addition, FIG. 6 illustrates the gripper 24 immediately before entering the delivery region, that is, the gripper 24 at a position upstream of the delivery region in the circulation direction. In the state illustrated in FIG. 6, the pair of attachment links 72A are not in mesh with the respective ones of the pair of sprockets 37.

As illustrated in FIGS. 7 to 12, in the delivery region, the lugs 26 and the lug base 27 of the gripper 24 are positioned to overlap the pair of sprockets 37 in rearward view. Here, to be positioned to "overlap the sprockets 37" means to be positioned inside the tip circle of the sprockets 37 (circle shown by one-dot chain line 37L in FIGS. 6 to 12). In the present exemplary embodiment, at least the lugs 26 and the lug base 27 of the gripper 24 overlap the sprockets 37 in the closely positioned state in which the recording medium P is pinched (state illustrated in FIGS. 11 and 12).

In the delivery region, the lugs 26 and the lug base 27 of the gripper 24 change from the closely positioned state (state illustrated in FIG. 7) to the separated state (state illustrated in FIGS. 8 and 9), and then change from the separated state (state illustrated in FIGS. 8 and 9) to the closely positioned state (state illustrated in FIG. 11). More specifically, for example, cams (not illustrated) provided on rotating shafts 37A of the sprockets 37 operate to move the lugs 26 toward and away from the lug base 27 in the delivery region. Accordingly, the lugs 26 and the lug base 27 change from the closely positioned state to the separated state and from the separated state to the closely positioned state. The lugs 26 and the lug base 27 may change from the closely positioned state to the separated state at a location upstream of the delivery region in the circulation direction and move into the delivery region while being in the separated state. In FIG. 6, the lugs 26 and the lug base 27 are in the closely positioned state when the gripper 24 is at a location upstream of the delivery region in the circulation direction, and move into the delivery region while being in the closely positioned state.

Figure 9:
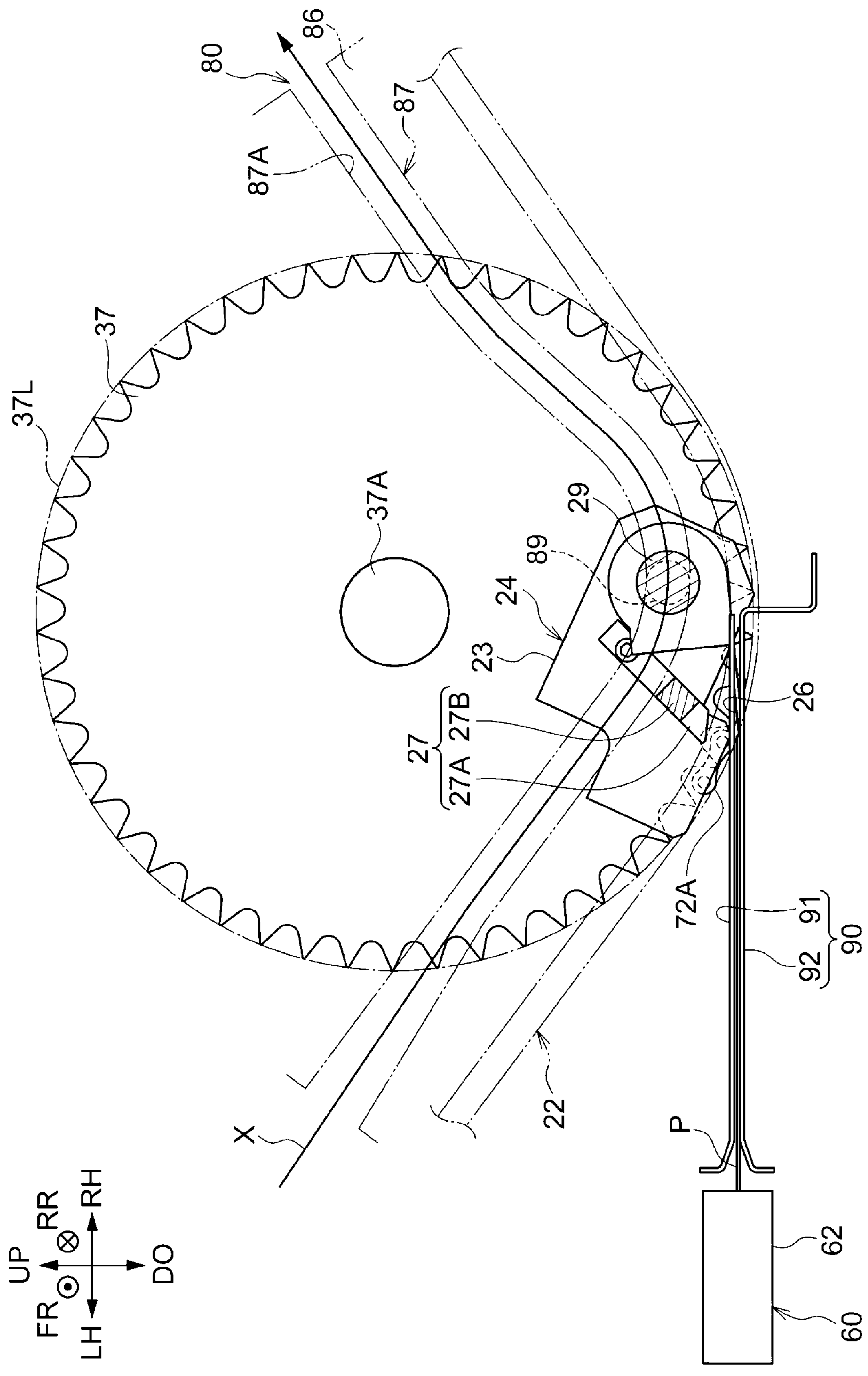
FIG. 9 is a sectional view illustrating the sequential operation in which the recording medium is received by the gripper according to the first exemplary embodiment.
Figure 10:
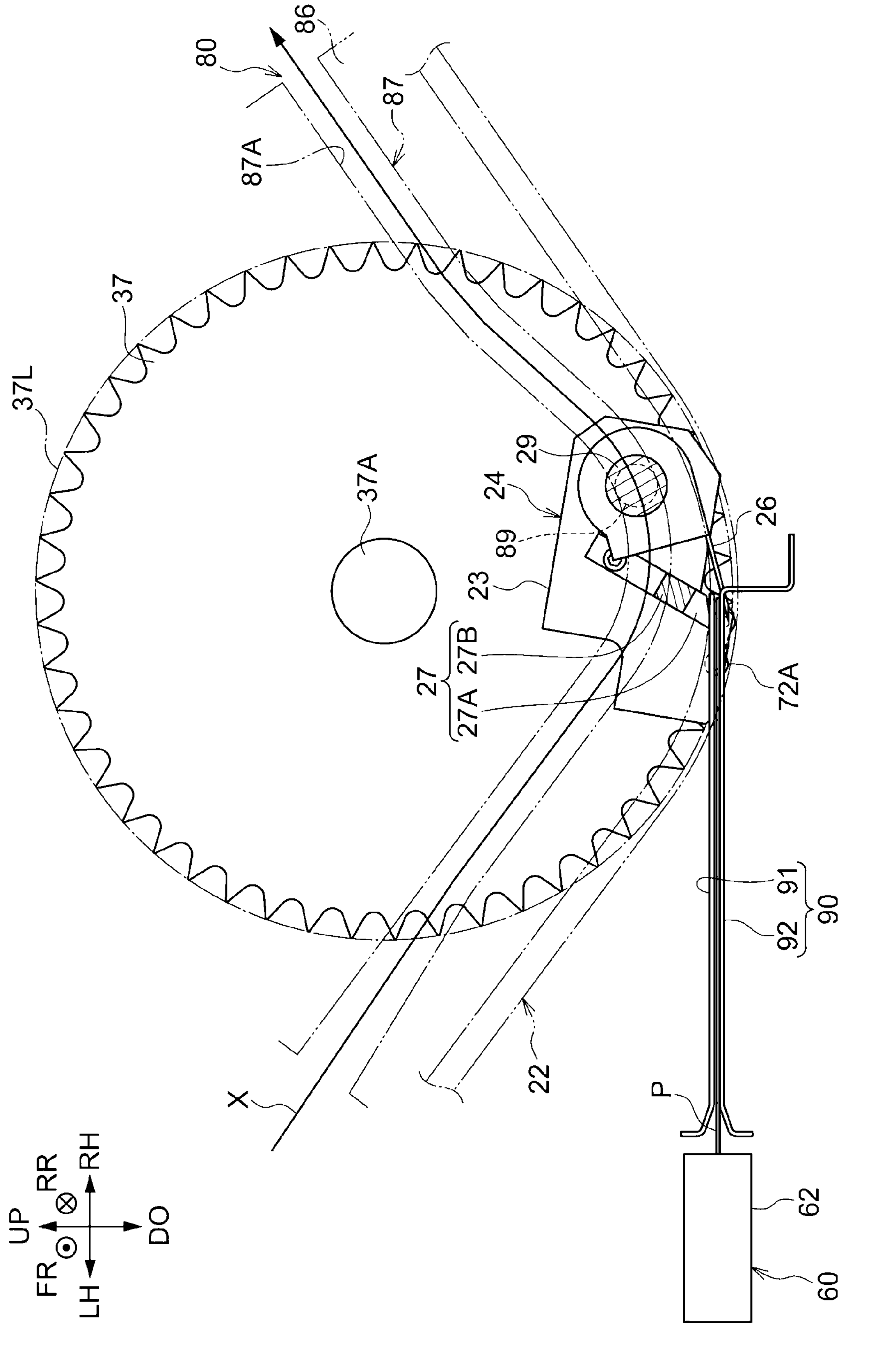
FIG. 10 is a sectional view illustrating the sequential operation in which the recording medium is received by the gripper according to the first exemplary embodiment.

As illustrated in FIG. 10, in the delivery region, the delivery mechanism 60 causes the leading end portion (that is, a downstream end portion in the transporting direction) of the recording medium P to enter the space between each lug 26 and the lug base 27 in the separated state. As illustrated in FIGS. 6 to 12, the delivery mechanism 60 includes a transport unit 62, a medium guide unit 90, and a gripper guide unit 80.

The transport unit 62 transports the recording medium P into the delivery region at a time corresponding to a passing time at which the lugs 26 and the lug base 27 of the gripper 24 pass through the delivery region, so that the recording medium P enters the space between each lug 26 and the lug base 27 in the separated state in the delivery region. The passing time is determined based on the distance between the delivery region and a detection position, which is upstream of the delivery region in the circulation direction and at which the gripper 24 is detected with a detector, such as a sensor, and the circulating speed at which the gripper 24 is circulated. The transport unit 62 includes transport members, such as transport rollers and a transport belt, for transporting the recording medium P.

The medium guide unit 90 has a function of guiding the recording medium P transported by the transport unit 62 into the space between each lug 26 and the lug base 27 in the separated state. As illustrated in FIGS. 9 and 10, the medium guide unit 90 is positioned to overlap the lugs 26 and the lug base 27 in the separated state in rearward view. The arrangement in which "the medium guide unit 90 overlaps the lugs 26 and the lug base 27 in the separated state in rearward view" means an arrangement in which the medium guide unit 90 overlaps at least portions of moving paths of the lugs 26 and the lug base 27 in the separated state during circulation of the gripper 24 in rearward view.

The medium guide unit 90 includes a first guide member 91 that guides an upper surface (example of one surface) of the recording medium P and a second guide member 92 that guides a lower surface (example of other surface) of the recording medium P. Both the first guide member 91 and the second guide member 92 are positioned to overlap the lugs 26 and the lug base 27 in the separated state in rearward view.

More specifically, end portions (i.e., downstream end portions in the transporting direction, right end portions, or projecting portions 91B and 92B (see FIG. 5)) of the first guide member 91 and the second guide member 92 are positioned to overlap the lugs 26 and the lug base 27 in the separated state.

As illustrated in FIG. 5, the first guide member 91 and the second guide member 92 are comb-shaped. The first guide member 91 and the second guide member 92 respectively include body portions 91A and 92A and the projecting portions 91B and 92B. The body portions 91A and 92A each have an elongated rectangular shape that extends in the front-rear direction in plan view. The length of the body portions 91A and 92A in the front-rear direction is greater than the length of the largest recording medium P in the front-rear direction (that is, in the width direction). The length of the projecting portions 91B and 92B in the front-rear direction is less than the length of the body portions 91A and 92A in the front-rear direction, and is less than the length of the smallest recording medium P in the front-rear direction (that is, in the width direction).

The projecting portions 91B and 92B project downstream in the transporting direction (that is, rightward) from the body portions 91A and 92A. Plural pairs of projecting portions 91B and 92B are arranged in the front-rear direction with intervals therebetween. In other words, gaps 93 are formed between the pairs of projecting portions 91B and 92B in the front-rear direction. The pairs of projecting portions 91B and 92B of the medium guide unit 90 are arranged alternately with the lugs 26 and portions of the lug base 27 (more specifically, the projecting portions 27A) in the separated state in the front-rear direction.

In addition, as illustrated in FIGS. 6 to 12, the medium guide unit 90 is positioned to overlap the pair of sprockets 37 in rearward view. More specifically, both the first guide member 91 and the second guide member 92 are positioned to overlap the pair of sprockets 37. Still more specifically, the end portions (i.e., downstream end portions in the transporting direction, right end portions, or the projecting portions 91B and 92B (see FIG. 5)) of the first guide member 91 and the second guide member 92 are positioned to overlap the pair of sprockets 37.

The first guide member 91 and the second guide member 92 respectively come into contact with the upper surface and the lower surface of the recording medium P to restrict displacement of the recording medium P from a predetermined transport path.

Meshing Period of Attachment Links 72A and Sprockets 37

As described above, the delivery mechanism 60 causes the recording medium P to move into the space between each lug 26 and the lug base 27 in the separated state in the delivery region in which the attachment links 72A mesh with the respective sprockets 37. The meshing period in which the attachment links 72A mesh with the respective sprockets 37 is determined as described below.

The attachment links 72A are in mesh with the sprockets 37 at least when the recording medium P starts to enter the space between each lug 26 and the lug base 27 in the separated state (see FIG. 9). More specifically, the attachment links 72A are in mesh with the sprockets 37 from when the recording medium P starts to enter the space between each lug 26 and the lug base 27 in the separated state to when the lugs 26 and the lug base 27 start to change from the separated state to the closely positioned state (see FIG. 10).

Still more specifically, the attachment links 72A are in mesh with the sprockets 37 from when the recording medium P starts to enter the space between each lug 26 and the lug base 27 in the separated state to when the lugs 26 and the lug base 27 pinch the recording medium P (see FIG. 11).

Figure 8:
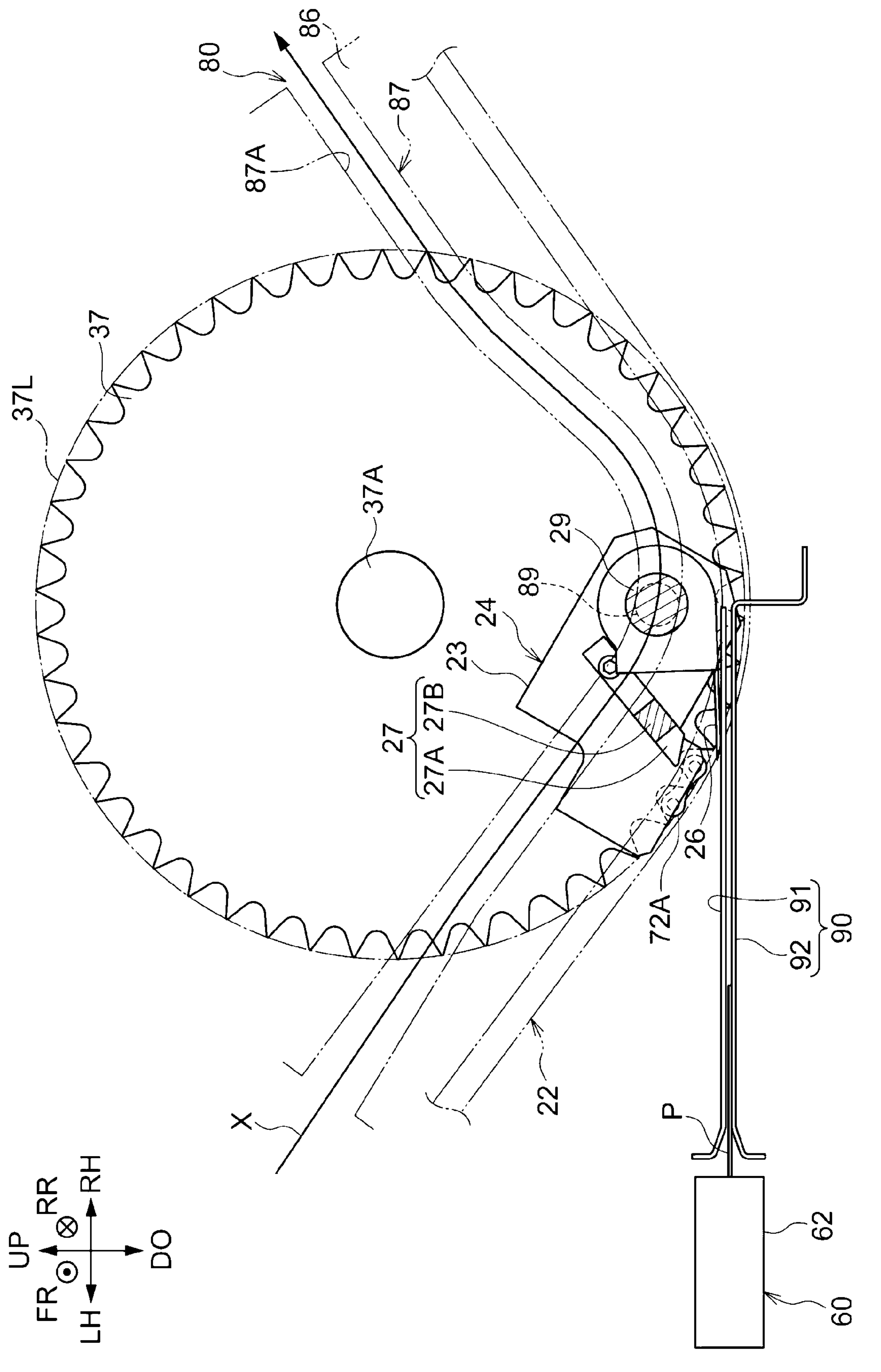
FIG. 8 is a sectional view illustrating the sequential operation in which the recording medium is received by the gripper according to the first exemplary embodiment.

Furthermore, the attachment links 72A come into mesh with the sprockets 37 (see FIG. 7) before the lugs 26 and the lug base 27 completely change from the closely positioned state to the separated state (state illustrated in FIG. 8). More specifically, the attachment links 72A come into mesh with the sprockets 37 while the lugs 26 and the lug base 27 are in the closely positioned state before starting to change to the separated state (see FIG. 7).

To summarize, the attachment links 72A come into mesh with the sprockets 37 while the lugs 26 and the lug base 27 are in the closely positioned state (see FIG. 7), and remain in mesh with the sprockets 37 until when, after the lugs 26 and the lug base 27 change from the closely positioned state to the separated state (see FIG. 8), the recording medium P that has entered the space between each lug 26 and the lug base 27 in the separated state is pinched (see FIG. 11).

The attachment links 72A are in contact with the sprockets 37 while being in mesh with the sprockets 37. Therefore, the state in which the attachment links 72A are in mesh with the sprockets 37 may be regarded as a state in which the attachment links 72A are in contact with the sprockets 37, and the meshing period may be regarded as a contact period.

Gripper Guide Unit 80

The gripper guide unit 80 has a function of guiding the gripper 24. More specifically, referring to FIGS. 6 to 12, the gripper guide unit 80 includes guide grooves 87 formed in side walls 86, each of which is disposed between the gripper 24 and one of the pair of sprockets 37. The guide grooves 87 guide respective ones of guide rollers 89 that are provided coaxially on one and the other end portions of the shaft 29 in the axial direction and that serve as portions to be guided. More specifically, the guide rollers 89 are inserted in the guide grooves 87, and are guided by guide surfaces 87A formed at the edges of the guide grooves 87, so that displacement of the gripper 24 including the lugs 26 and the lug base 27 from the predetermined circulating path (see arrow X) is restricted.

More specifically, the gripper guide unit 80 restricts displacement of the gripper 24 including the lugs 26 and the lug base 27 from the predetermined circulating path (see arrow X) from when the recording medium P starts to enter the space between each lug 26 and the lug base 27 (see FIG. 9) to when the lugs 26 and the lug base 27 start to change from the separated state to the closely positioned state (see FIG. 10).

Still more specifically, the gripper guide unit 80 restricts displacement of the gripper 24 including the lugs 26 and the lug base 27 from the predetermined circulating path (see arrow X) from when the recording medium P starts to enter the space between each lug 26 and the lug base 27 (see FIG. 9) to when the lugs 26 and the lug base 27 pinch the recording medium P (see FIG. 11).

In the present exemplary embodiment, the gripper guide unit 80 restricts displacement of the gripper 24 including the lugs 26 and the lug base 27 from the predetermined circulating path (see arrow X) from when the attachment links 72A come into mesh with the sprockets 37 while the lugs 26 and the lug base 27 are in the closely positioned state to when, after the lugs 26 and the lug base 27 change from the closely positioned state to the separated state, the recording medium P that has entered the space between each lug 26 and the lug base 27 in the separated state is pinched.

Operation of First Exemplary Embodiment

The operation of the first exemplary embodiment will now be described.

According to the structure of the present exemplary embodiment, the attachment links 72A are in mesh with the sprockets 37 when the recording medium P starts to enter the space between each lug 26 and the lug base 27 in the separated state (see FIG. 9). Therefore, compared to the structure in which the attachment links 72A are not in mesh (or contact) with the sprockets 37 when the recording medium P starts to enter the space between each lug 26 and the lug base 27 in the separated state, variation in the position of the gripper 24 including the lugs 26 and the lug base 27 is reduced.

More specifically, according to the structure of the present exemplary embodiment, the attachment links 72A are in mesh with the sprockets 37 from when the recording medium P starts to enter the space between each lug 26 and the lug base 27 in the separated state to when the lugs 26 and the lug base 27 start to change from the separated state to the closely positioned state (see FIG. 10).

Still more specifically, according to the structure of the present exemplary embodiment, the attachment links 72A are in mesh with the sprockets 37 from when the recording medium P starts to enter the space between each lug 26 and the lug base 27 in the separated state to when the lugs 26 and the lug base 27 pinch the recording medium P (see FIG. 11).

Furthermore, according to the structure of the present exemplary embodiment, the attachment links 72A come into mesh with the sprockets 37 (see FIG. 7) before the lugs 26 and the lug base 27 completely change from the closely positioned state to the separated state (state illustrated in FIG. 8).

In addition, according to the structure of the present exemplary embodiment, the gripper guide unit 80 restricts displacement of the gripper 24 including the lugs 26 and the lug base 27 from the predetermined circulating path (see arrow X) from when the recording medium P starts to enter the space between each lug 26 and the lug base 27 (see FIG. 9) to when the lugs 26 and the lug base 27 start to change from the separated state to the closely positioned state (see FIG. 10). Therefore, compared to the structure in which the gripper 24 including the lugs 26 and the lug base 27 is freely displaced from the predetermined circulating path (see arrow X) in a period from when the recording medium P starts to enter the space between each lug 26 and the lug base 27 (see FIG. 9) to when the lugs 26 and the lug base 27 start to change from the separated state to the closely positioned state (see FIG. 10), variation in the position of the gripper 24 including the lugs 26 and the lug base 27 is reduced.

More specifically, according to the structure of the present exemplary embodiment, the gripper guide unit 80 restricts displacement of the gripper 24 including the lugs 26 and the lug base 27 from the predetermined circulating path (see arrow X) from when the recording medium P starts to enter the space between each lug 26 and the lug base 27 (see FIG. 9) to when the lugs 26 and the lug base 27 pinch the recording medium P (see FIG. 11).

In addition, according to the structure of the present exemplary embodiment, as illustrated in FIGS. 9 and 10, the medium guide unit 90 is positioned to overlap the lugs 26 and the lug base 27 in the separated state in rearward view. Therefore, unlike in the structure in which the medium guide unit 90 is displaced from the lugs 26 and the lug base 27 in the separated state (for example, separated from the lugs 26 and the lug base 27 in the separated state toward the left) in rearward view, the recording medium P may be guided until the recording medium P is pinched between each lug 26 and the lug base 27. Here, the "structure in which the medium guide unit 90 is displaced from the lugs 26 and the lug base 27 in the separated state in rearward view" means a structure in which the lugs 26 and the lug base 27 in the separated state that are circulated together with the chains 22 do not pass through any position at which the lugs 26 and the lug base 27 overlap the medium guide unit 90.

In addition, according to the structure of the present exemplary embodiment, both the first guide member 91 and the second guide member 92 are positioned to overlap the lugs 26 and the lug base 27 in the separated state in rearward view. Therefore, unlike in the structure in which only one of the first guide member 91 and the second guide member 92 is positioned to overlap the lugs 26 and the lug base 27 in the separated state in rearward view, both surfaces of the recording medium P may be guided until the recording medium P is pinched between each lug 26 and the lug base 27.

In addition, according to the structure of the present exemplary embodiment, the medium guide unit 90 includes plural portions arranged alternately with the lugs 26 and portions (more specifically, projecting portions 27A) of the lug base 27 in the separated state in the front-rear direction. Since the medium guide unit 90 includes plural portions arranged alternately with the lugs 26 and portions of the lug base 27 in the separated state in the front-rear direction, the medium guide unit 90 may be prevented from interfering with the lugs 26 and the lug base 27 in the separated state.

In addition, according to the structure of the present exemplary embodiment, both the projecting portions 91B and the projecting portions 92B are arranged alternately with the lugs 26 and portions (more specifically, projecting portions 27A) of the lug base 27 in the separated state in the front-rear direction.

In addition, according to the structure of the present exemplary embodiment, as illustrated in FIGS. 6 to 12, the medium guide unit 90 is positioned to overlap the pair of sprockets 37 in rearward view.

In addition, according to the structure of the present exemplary embodiment, as illustrated in FIGS. 7 to 12, the lugs 26 and the lug base 27 of the gripper 24 are positioned to overlap the pair of sprockets 37 in rearward view in the delivery region.

Modifications

Although the chains 22 are used as examples of a circulating member and the sprockets 25, 37, and 45 are used as examples of a rotating member in the present exemplary embodiment, the circulating member and the rotating member are not limited to this. For example, a timing belt having projections and recesses on the inner periphery thereof may be used as an example of the circulating member, and a timing pulley (i.e., a pulley having projections and recesses on the outer periphery thereof) may be used as an example of the rotating member. Alternatively, a belt may be used as an example of the circulating member, and a pulley that circulates the belt by friction may be used as an example of the rotating member. In this structure, the pulley does not mesh with the belt but rotates while being in contact with the belt to circulate the belt. In addition, in this structure, an attachment portion of the belt to which the gripper 24 is attached is in contact with the pulley when the recording medium P starts to enter the space between each lug 26 and the lug base 27 in the separated state.

In addition, although the gripper 24 is attached to a single link of each chain 22 in the present exemplary embodiment, the gripper 24 is not limited to this. The gripper 24 may instead be attached to plural links of each chain 22. In such a case, at least one of the plural links may be in mesh with the corresponding sprocket 37 when the recording medium P starts to enter the space between each lug 26 and the lug base 27 in the separated state.

Although the paper sheet P is used as the recording medium P that serves as an example of a transport object, the recording medium P is not limited to this. The recording medium P may instead be, for example, a resin film or a metal film, and any transportable recording medium may be used. In addition, although the recording medium P on which an image is formed is used as an example of a transport object in the present exemplary embodiment, the transport object is not limited to this. The transport object may instead be, for example, an object transported for a purpose other than formation of an image thereon, for example, for inspection or other processes, or for the purpose of transportation.

According to the structure of the present exemplary embodiment, the attachment links 72A are in mesh with the sprockets 37 when the recording medium P starts to enter the space between each lug 26 and the lug base 27 in the separated state. However, the attachment links 72A are not limited to this. For example, the attachment links 72A may not be in mesh with (that is, in contact with) the sprockets 37 when the recording medium P starts to enter the space between each lug 26 and the lug base 27 in the separated state.

According to the structure of the present exemplary embodiment, the attachment links 72A are in mesh with the sprockets 37 from when the recording medium P starts to enter the space between each lug 26 and the lug base 27 in the separated state to when the lugs 26 and the lug base 27 pinch the recording medium P (see FIG. 11). However, the attachment links 72A are not limited to this. For example, the attachment links 72A may instead be in mesh with the sprockets 37 only from when the recording medium P starts to enter the space between each lug 26 and the lug base 27 in the separated state to when the lugs 26 and the lug base 27 start to change from the separated state to the closely positioned state. It is only necessary that the attachment links 72A be in mesh with the sprockets 37 when the recording medium P starts to enter the space between each lug 26 and the lug base 27 in the separated state.

In addition, according to the structure of the present exemplary embodiment, the attachment links 72A come into mesh with the sprockets 37 (see FIG. 7) before the lugs 26 and the lug base 27 completely change from the closely positioned state to the separated state (state illustrated in FIG. 8). However, the attachment links 72A are not limited to this. For example, the attachment links 72A may instead be in mesh with the sprockets 37 only when the recording medium P starts to enter the space between each lug 26 and the lug base 27 in the separated state. It is only necessary that the attachment links 72A be in mesh with the sprockets 37 when the recording medium P starts to enter the space between each lug 26 and the lug base 27 in the separated state.

According to the structure of the present exemplary embodiment, the gripper guide unit 80 restricts displacement of the gripper 24 including the lugs 26 and the lug base 27 from the predetermined circulating path (see arrow X) from when the recording medium P starts to enter the space between each lug 26 and the lug base 27 (see FIG. 9) to when the lugs 26 and the lug base 27 pinch the recording medium P (see FIG. 11). However, the gripper guide unit 80 is not limited to this. For example, the gripper guide unit 80 may instead be structured to restrict displacement of the gripper 24 including the lugs 26 and the lug base 27 from the predetermined circulating path (see arrow X) from when the recording medium P starts to enter the space between each lug 26 and the lug base 27 (see FIG. 9) to when the lugs 26 and the lug base 27 start to change from the separated state to the closely positioned state (see FIG. 10). Also, the gripper guide unit 80 may be omitted.

In addition, according to the structure of the present exemplary embodiment, both the first guide member 91 and the second guide member 92 are positioned to overlap the lugs 26 and the lug base 27 in the separated state in rearward view. However, the first guide member 91 and the second guide member 92 are not limited to this. For example, only one of the first guide member 91 and the second guide member 92 may be positioned to overlap the lugs 26 and the lug base 27 in the separated state in rearward view.

In addition, according to the structure of the present exemplary embodiment, the medium guide unit 90 includes plural portions arranged alternately with the lugs 26 and portions of the lug base 27 in the separated state in the front-rear direction. However, the arrangement is not limited to this. For example, the medium guide unit 90 may instead be structured such that a portion thereof is disposed only at one side of the lugs 26 and the lug base 27 in the separated state in the front-rear direction.

In addition, according to the structure of the present exemplary embodiment, both the projecting portions 91B and the projecting portions 92B are arranged alternately with the lugs 26 and portions of the lug base 27 in the separated state in the front-rear direction. For example, only the projecting portions 91B or only the projecting portions 91B may be arranged alternately with the lugs 26 and portions of the lug base 27 in the separated state in the front-rear direction.

In addition, according to the structure of the present exemplary embodiment, as illustrated in FIGS. 6 to 12, the medium guide unit 90 is positioned to overlap the pair of sprockets 37 in rearward view. However, the medium guide unit 90 is not limited to this. For example, the medium guide unit 90 may instead be displaced from the pair of sprockets 37 in rearward view.

In addition, according to the structure of the present exemplary embodiment, as illustrated in FIGS. 7 to 12, the lugs 26 and the lug base 27 of the gripper 24 are positioned to overlap the pair of sprockets 37 in rearward view in the delivery region. However, the gripper 24 is not limited to this. For example, the lugs 26 and the lug base 27 may instead be displaced from the pair of sprockets 37 in rearward view.

SECOND EXEMPLARY EMBODIMENT

Image Forming Apparatus 200

Figure 13:
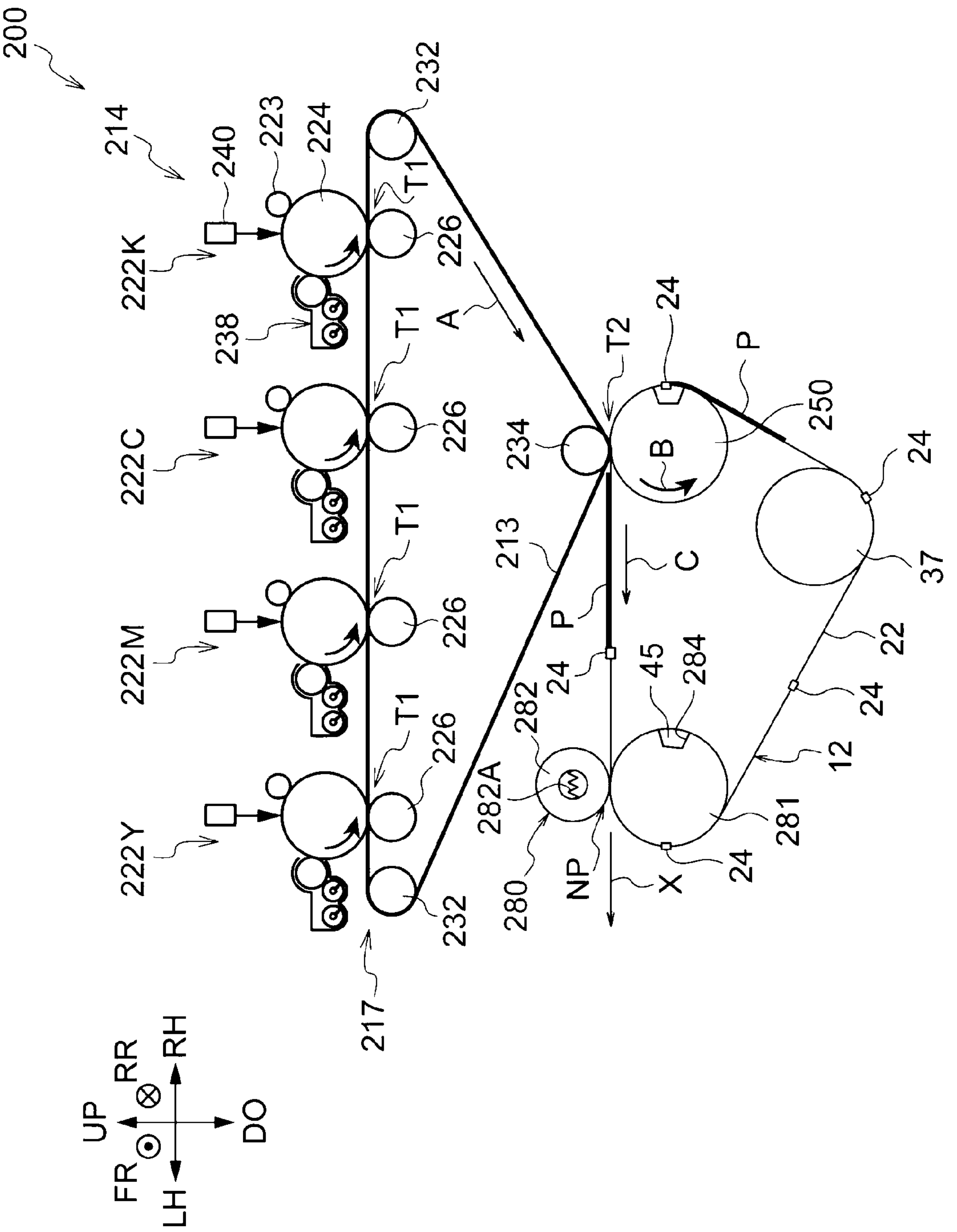
FIG. 13 is a schematic diagram illustrating the structure of an image forming apparatus according to a second exemplary embodiment.

In the first exemplary embodiment, the image forming apparatus 10 is an inkjet image forming apparatus that forms an image on each recording medium P with ink. However, the image forming apparatus is not limited to this. The image forming apparatus may instead be, for example, an electrophotographic image forming apparatus, and may be any apparatus that forms an image. In a second exemplary embodiment, an electrophotographic image forming apparatus 200 will be described. FIG. 13 is a schematic diagram illustrating the structure of the image forming apparatus 200 according to the present exemplary embodiment. Components having the same functions as those of the first exemplary embodiment are denoted by the same reference signs, and description thereof is omitted as appropriate.

Image Forming Unit 214

The image forming apparatus 200 includes an image forming unit 214 instead of the image forming unit 14. The image forming unit 214 has a function of forming a toner image (example of an image) on each recording medium P by an electrophotographic system. Still more specifically, as illustrated in FIG. 13, the image forming unit 214 includes plural toner image forming units 222 which each form a toner image and a transfer device 217 that transfers the toner images formed by the toner image forming units 222 to the recording medium P.

Toner Image Forming Units 222

The toner image forming units 222 illustrated in FIG. 13 form toner images of respective colors. In the present exemplary embodiment, four toner image forming units 222 of the respective colors, which are yellow (Y), magenta (M), cyan (C), and black (K), are provided. In FIG. 13, the letters Y, M, C, and K represent the respective colors.

The toner image forming units 222 of the respective colors have the same structure except for the toners used therein. Therefore, in FIG. 13, only components of the toner image forming unit 222K, which serves as a representative one of the toner image forming units 222 of the respective colors, are denoted by reference numerals.

Each of the toner image forming units 222 of the respective colors includes a photoconductor 224 that rotates in one direction (for example, counterclockwise in FIG. 13). In addition, each of the toner image forming units 222 of the respective colors also includes a charging device 223, an exposure device 240, and a developing device 238.

In each of the toner image forming units 222 of the respective colors, the charging device 223 charges the photoconductor 224. In addition, the exposure device 240 exposes the photoconductor 224 charged by the charging device 223 to light and thereby forms an electrostatic latent image on the photoconductor 224. In addition, the developing device 238 develops the electrostatic latent image formed on the photoconductor 224 by the exposure device 240 and thereby forms a toner image.

Transfer Device 217

The transfer device 217 illustrated in FIG. 13 is a device the transfers the toner images formed by the toner image forming units 222 to the recording medium P. More specifically, the transfer device 217 transfers the toner images on the photoconductors 224 of the respective colors to a transfer belt 213, which serves as an intermediate transfer body, in a superposed manner in a first transfer process, and then transfers the superposed toner images to the recording medium P in a second transfer process. As illustrated in FIG. 13, the transfer device 217 includes the transfer belt 213, first transfer rollers 226, and a transfer body 250.

The first transfer rollers 226 are rollers that transfer the toner images on the photoconductors 224 of the respective colors to the transfer belt 213 at first transfer positions T1 between the photoconductors 224 and the first transfer rollers 226. In the present exemplary embodiment, a first transfer electric field is applied between the first transfer rollers 226 and the photoconductors 224, so that the toner images formed on the photoconductors 224 are transferred to the transfer belt 213 at the first transfer positions T1.

The toner images are transferred from the photoconductors 224 of the respective colors to the outer peripheral surface of the transfer belt 213. As illustrated in FIG. 13, the transfer belt 213 has an endless shape and is wrapped around plural rollers 232 and an opposing roller 234 to form an inverted triangular shape in front view (view in an apparatus depth direction). At least one of the plural rollers 232 is rotated so that the transfer belt 213 is circulated in the direction of arrow A.

The transfer body 250 is a roller that transfers the toner images that have been transferred to the transfer belt 213 to the recording medium P at a second transfer position T2 between the opposing roller 234 and the transfer body 250. In the present exemplary embodiment, a second transfer electric field is applied between the opposing roller 234 and the transfer body 250 so that the toner images that have been transferred to the transfer belt 213 are transferred to the recording medium P at the second transfer position T2. The transfer body 250 has a structure similar to that of the rotating body 50 according to the first exemplary embodiment, and serves as an example of a rotating body.

Fixing Device 280

In the present exemplary embodiment, the fixing device 280 functions as a device that fixes the toner images that have been transferred to the recording medium P by the transfer body 250 to the recording medium P. As illustrated in FIG. 13, the fixing device 280 includes a pressing roller 281 and a heating roller 282.

The pair of sprockets 45 according to the first exemplary embodiment are provided at both ends of the pressing roller 281 in the axial direction. The pair of sprockets 45 are disposed coaxially with the pressing roller 281 and configured to rotate together with the pressing roller 281. The pressing roller 281 has a recess 284 for receiving grippers 24 and attachment members 23 in the outer periphery thereof.

In the fixing device 280, the heating roller 282 is disposed above the pressing roller 281. The heating roller 282 includes a heating source 282A, such as a halogen lamp, disposed therein.

The fixing device 280 is configured such that, for example, one of the pressing roller 281 and the heating roller 282 is driven to rotate, and the other of the pressing roller 281 and the heating roller 282 is rotated accordingly. Alternatively, both the pressing roller 281 and the heating roller 282 may be driven to rotate.

In the fixing device 280, the heating roller 282 and the pressing roller 281 transport the recording medium P while the recording medium P is nipped therebetween, and apply heat and pressure to the recording medium P so that the toner images that have been transferred to the recording medium P are fixed to the recording medium P.

In the image forming apparatus 200, a transport device 12 circulates chains 22 in a circulation direction C while the leading end portion of the recording medium P is held by one of the grippers 24, so that the recording medium P passes through a second transfer position T2 and a fixing position NP between the pressing roller 281 and the heating roller 282. The toner images that have been transferred to the transfer belt 213 in a superposed manner at the first transfer positions T1 of the respective colors in the first transfer process are transferred to the recording medium P at the second transfer position T2 in the second transfer process. The toner images that have been transferred to the recording medium P in the second transfer process are fixed to the recording medium P at the fixing position NP.

The structure of the transport device 12 according to the present exemplary embodiment is similar to that of the transport device 12 according to the first exemplary embodiment, and the present exemplary embodiment has effects similar to those of the first exemplary embodiment.

The present disclosure is not limited to the above-described exemplary embodiments, and various modifications, alterations, and improvements are possible without departing from the spirit of the present disclosure. For example, the above-described modifications may be applied in combinations with each other as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A transport device comprising:

a rotating member that rotates;

a circulating member that is loop-shaped and wrapped around the rotating member, the circulating member being circulated by rotation of the rotating member;

a pair of pinching members attached to the circulating member and circulated together with the circulating member, the pair of pinching members changing from a separated state, in which the pair of pinching members are separated from each other, to a closely positioned state to pinch a transport object that has entered a space between the pair of pinching members in the separated state; and a guide unit positioned to overlap the pair of pinching members in the separated state when viewed in one direction along a rotational axis direction of the rotating member, the guide unit guiding the transport object into the space between the pair of pinching members in the separated state, the guide unit being positioned not to overlap the pair of pinching members in the closely positioned state where the pair of pinching members pinch the transport object when viewed in the one direction.

2. The transport device according to claim 1, wherein the guide unit includes a first guide member that guides one surface of the transport object and a second guide member that guides other surface of the transport object, the first guide member and the second guide member being positioned to overlap the pair of pinching members in the separated state when viewed in the one direction.

3. The transport device according to claim 1, wherein the guide unit includes a plurality of portions arranged alternately with a plurality of portions of the pair of pinching members in the separated state in the one direction, the plurality of portions of the pair of pinching members pinching the transport object.

4. The transport device according to claim 2, wherein the guide unit includes a plurality of portions arranged alternately with a plurality of portions of the pair of pinching members in the separated state in the one direction, the plurality of portions of the pair of pinching members pinching the transport object.

5. The transport device according to claim 3, wherein the guide unit includes a first guide member that guides one surface of the transport object and a second guide member that guides other surface of the transport object, and wherein the first guide member and the second guide member each include a plurality portions arranged alternately with the plurality of portions of the pair of pinching members in the separated state in the one direction, the plurality of portions of the pair of pinching members pinching the transport object.

6. The transport device according to claim 4, wherein the first guide member and the second guide member each include a plurality portions arranged alternately with the plurality of portions of the pair of pinching members in the separated state in the one direction, the plurality of portions of the pair of pinching members pinching the transport object.

7. The transport device according to claim 1, wherein the guide unit is positioned to overlap the rotating member when viewed in the one direction.

8. The transport device according to claim 2, wherein the guide unit is positioned to overlap the rotating member when viewed in the one direction.

9. The transport device according to claim 3, wherein the guide unit is positioned to overlap the rotating member when viewed in the one direction.

10. The transport device according to claim 4, wherein the guide unit is positioned to overlap the rotating member when viewed in the one direction.

11. The transport device according to claim 5, wherein the guide unit is positioned to overlap the rotating member when viewed in the one direction.

12. The transport device according to claim 6, wherein the guide unit is positioned to overlap the rotating member when viewed in the one direction.

13. The transport device according to claim 7, wherein the pair of pinching members are positioned to overlap the rotating member when viewed in the one direction.

14. The transport device according to claim 8, wherein the pair of pinching members are positioned to overlap the rotating member when viewed in the one direction.

15. The transport device according to claim 9, wherein the pair of pinching members are positioned to overlap the rotating member when viewed in the one direction.

16. The transport device according to claim 10, wherein the pair of pinching members are positioned to overlap the rotating member when viewed in the one direction.

17. The transport device according to claim 11, wherein the pair of pinching members are positioned to overlap the rotating member when viewed in the one direction.

18. The transport device according to claim 12, wherein the pair of pinching members are positioned to overlap the rotating member when viewed in the one direction.

19. A transport device comprising:

a rotating member that rotates;

a circulating member that is loop-shaped and wrapped around the rotating member, the circulating member being circulated by rotation of the rotating member;

a pair of pinching members attached to the circulating member and circulated together with the circulating member, the pair of pinching members changing from a separated state, in which the pair of pinching members are separated from each other, to a closely positioned state to pinch a transport object that has entered a space between the pair of pinching members in the separated state; and a guide unit positioned to overlap the rotating member when viewed in one direction along a rotational axis direction of the rotating member, the guide unit guiding the transport object into the space between the pair of pinching members in the separated state, the guide unit being positioned not to overlap the pair of pinching members in the closely positioned state where the pair of pinching members pinch the transport object when viewed in the one direction.

20. An image forming apparatus comprising:

the transport device according to claim 1; and an image forming unit that forms an image on a recording medium that serves as the transport object transported by the transport device.

* * * * *